United States Patent
Kingsbury et al.

(10) Patent No.: US 8,131,728 B2
(45) Date of Patent: Mar. 6, 2012

(54) PROCESSING LARGE SIZED RELATIONSHIP-SPECIFYING MARKUP LANGUAGE DOCUMENTS

(75) Inventors: Kevin M. Kingsbury, Bastrop, TX (US); David G. Robinson, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1210 days.

(21) Appl. No.: 11/426,144

(22) Filed: Jun. 23, 2006

(65) Prior Publication Data

US 2008/0010632 A1    Jan. 10, 2008

(51) Int. Cl.
G06F 7/00 (2006.01)
G06F 17/30 (2006.01)

(52) U.S. Cl. ........................ 707/741
(58) Field of Classification Search ............. 707/711, 707/741
See application file for complete search history.

(56) References Cited

U.S. PATENT DOCUMENTS

| | | | |
|---|---|---|---|
| 6,240,407 B1 * | 5/2001 | Chang et al. | 707/711 |
| 6,795,868 B1 * | 9/2004 | Dingman et al. | 709/246 |
| 2002/0046221 A1 * | 4/2002 | Louis Wallace et al. | 707/513 |
| 2003/0123721 A1 * | 7/2003 | Megiddo et al. | 382/159 |
| 2004/0098384 A1 | 5/2004 | Min et al. | |
| 2004/0167864 A1 | 8/2004 | Wang et al. | |
| 2006/0036564 A1 | 2/2006 | Yan et al. | |
| 2006/0085737 A1 | 4/2006 | Liu | |
| 2008/0010313 A1 * | 1/2008 | Thede | 707/102 |

OTHER PUBLICATIONS

Kiss, A, et al; Combining Tree Structure Indexes with Structural Indexes in Query Evaluation on XML Data; Proceedings for Advances in Databases and Information Systems, European Conference, ADBIS Sep. 12-15, 2005.

Hao He, et al; Multiresolution Indexing of XML for Frequent Queries; Proceedings of the 20th International Conference on Data Engineering, pp. 683-694, Mar. 30-Apr. 2, 2004.

* cited by examiner

*Primary Examiner* — Hosain T Alam
*Assistant Examiner* — Van Oberly
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to processing markup language documents and provide a method, system and computer program product for processing large relationship-specifying markup language documents. In an embodiment of the invention, a method can be provided for processing large relationship-specifying markup language documents. The method can include generating an index of nodes each node corresponding to a clause in the markup language document, processing the index in lieu of the markup language document, identifying clauses referenced within the index to be written to a database and extracting the identified clauses from the markup language document and writing the extracted clauses to the database.

10 Claims, 2 Drawing Sheets

PROCESSING LARGE SIZED RELATIONSHIP-SPECIFYING MARKUP LANGUAGE DOCUMENTS

BACKGROUND OF THE INVENTION

1. Field of the Invention

The present invention relates to the field of markup processing and more particularly to processing large sized relationship-specifying markup language documents.

2. Description of the Related Art

The Extensible Markup Language (XML) is a markup language specification widely credited with improving the functionality of the World Wide Web by allowing the identification of information in a more accurate, flexible, and adaptable way. XML is referred to as "extensible" because XML is not a fixed format like the hypertext markup language (HTML) which is a single, predefined markup language. Rather, XML is a meta-language that describes other languages. As such, XML allows for the design of other markup languages for limitless different types of documents. XML can act as a meta-language because XML is written according to the standardized general markup language (SGML)—the international standard meta-language for text document markup.

There are several methods for processing an XML document. In one method, every clause in the XML document is accounted for and a hierarchical model can be constructed reflecting the interrelationships between the clauses of the XML document. Referred to as a document object model (DOM), the DOM tree once in memory can be traversed at will in order to manipulate the XML document. Another method provides for the event-driven serial parsing of clauses in an XML document. Referred to as "SAX" parsing—an acronym for simple application programming interface (API) for XML—consumes a significantly smaller memory footprint than DOM processing as an entire hierarchical model in the form of a DOM tree need not be constructed prior to processing the XML document.

XML documents have proven particularly effective in representing the state and content of an enterprise computing architecture. Specifically, XML documents have been utilized to import content into and export content from a configuration management database (CMDB). A CMDB is a unified or federated repository of information related to all the components of an information system. A CMDB provides a view to the information technology manager of an organization in order to understand the relationships between the components of the information system. The CMDB further facilitates the monitoring and management of the configuration of the components of the information system.

Component and relationship information imported from information technology (IT) management systems into a CMDB can be provided in XML documents. Examining the content of an XML document used to import information from an IT management system into a CMDB will reveal that subsets of components are linked together by relationships. Furthermore, in examining all of the components linked by a set of relationships, a set of data graphs can be constructed where the nodes of the graphs represent the components and the connectors represent the relationships.

One requirement of a conventional CMDB is that data graphs are to be written to the database. Data graphs generally include a single object, or multiple objects. Data graphs to be loaded into the CMDB generally are loaded by an XML parsing program that processes an XML document. The XML document generally contains descriptions of the data objects to be loaded into the CMDB as well as the relationships between the data objects. In order to load the data from the XML document into the CMDB database, the data graph represented in the XML document must be reconstructed in memory as objects and the relationships between the objects must be understood.

Loading the data graph reflected in the XML document has proven inefficient—particularly where the XML document is very large in size as can be the case with configuration management data. As it will be understood, using a DOM tree to process a very large XML document can consume an inordinate amount of memory. Likewise, SAX parsing a very large XML document still requires the creation in memory of the objects reflected in the XML document and the stitching together of the relationships between the objects. Also, in SAX parsing, multiple passes through the large XML document can be required as there is no guaranteed order in which components and relationships will appear that are needed to construct the data graphs. Accordingly, conventional techniques for bulk loading a large relationship-specifying markup language document into a database have proven inadequate.

BRIEF SUMMARY OF THE INVENTION

Embodiments of the present invention address deficiencies of the art in respect to processing markup language documents and provide a novel and non-obvious method, system and computer program product for processing large relationship-specifying markup language documents. In an embodiment of the invention, a method can be provided for processing large relationship-specifying markup language documents. The method can include generating an index of nodes where each node corresponding to a clause in the markup language document, processing the index in lieu of the markup language document, identifying clauses referenced within the index to be written to a database and extracting the identified clauses from the markup language document and writing the extracted clauses to the database.

In one aspect of the embodiment, generating an index of nodes can include reading small chunks of the markup language document into a rolling buffer, and expression matching on the small chunks to identify individual clauses. Responsive to identifying an individual clause in the rolling buffer, a node can be added to the index with both an identifier for the individual clause and a position in the markup language document of the individual clause. Additionally, extracting the identified clauses from the markup language document and writing the extracted clauses to the database can include seeking to respective positions in the markup language document for different ones of the identified clauses, extracting the different ones of the identified clauses from the markup language document, and writing the extracted different ones of the identified clauses to the database.

In another embodiment of the invention, a markup language processing data processing system can be provided. The data processing system can include a rolling buffer, in-memory index generation logic coupled to the rolling buffer, multiple regular expressions accessible by the in-memory index generation logic, and a database. Notably, the in-memory index generation logic can include program code enabled to generate an index as a surrogate for a corresponding markup language document. As such, the index can include multiple nodes, each referencing a clause in the markup language document. Each of the nodes further can include a position in the markup language document for a referenced clause.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, data processing system and computer program product for the efficient processing of large relationship-specifying markup language documents in uploading content to a database, for instance a CMDB type database. In accordance with an embodiment of the invention, small chunks of a relationship-specifying markup language document can be read into a window buffer. Regular expression pattern matching can be applied to the content in the window buffer in order to identify clauses in the markup language document. For each identified clause, the identity of the clause and the position of the clause within the markup language document can be stored in a node in an index for the markup language document. In this way, the index can provide a lightweight representation of the clauses in the markup language document and the relationship between the clauses in the markup language document.

The index can be processed in lieu of the markup language document in order to recognize relationships between the different clauses in the markup language document. Whenever clauses are to be written to a database, for instance a CMDB type database, the position within the markup language document for each of the clauses can be retrieved, for example a byte offset. Thereafter, the clauses can be retrieved and written to the database along with the relationships between the clauses. In this way, the entirety of the markup language document can be processed without first requiring the construction of a DOM tree for the document, the loading of the entire document into memory, or multiple scans of the document to locate related nodes. Optionally, different portions of the markup language document can be processed as described herein concurrently in different threads of execution in order to more efficiently process the markup language in a single pass while consuming a minimum of memory.

Figure 1:
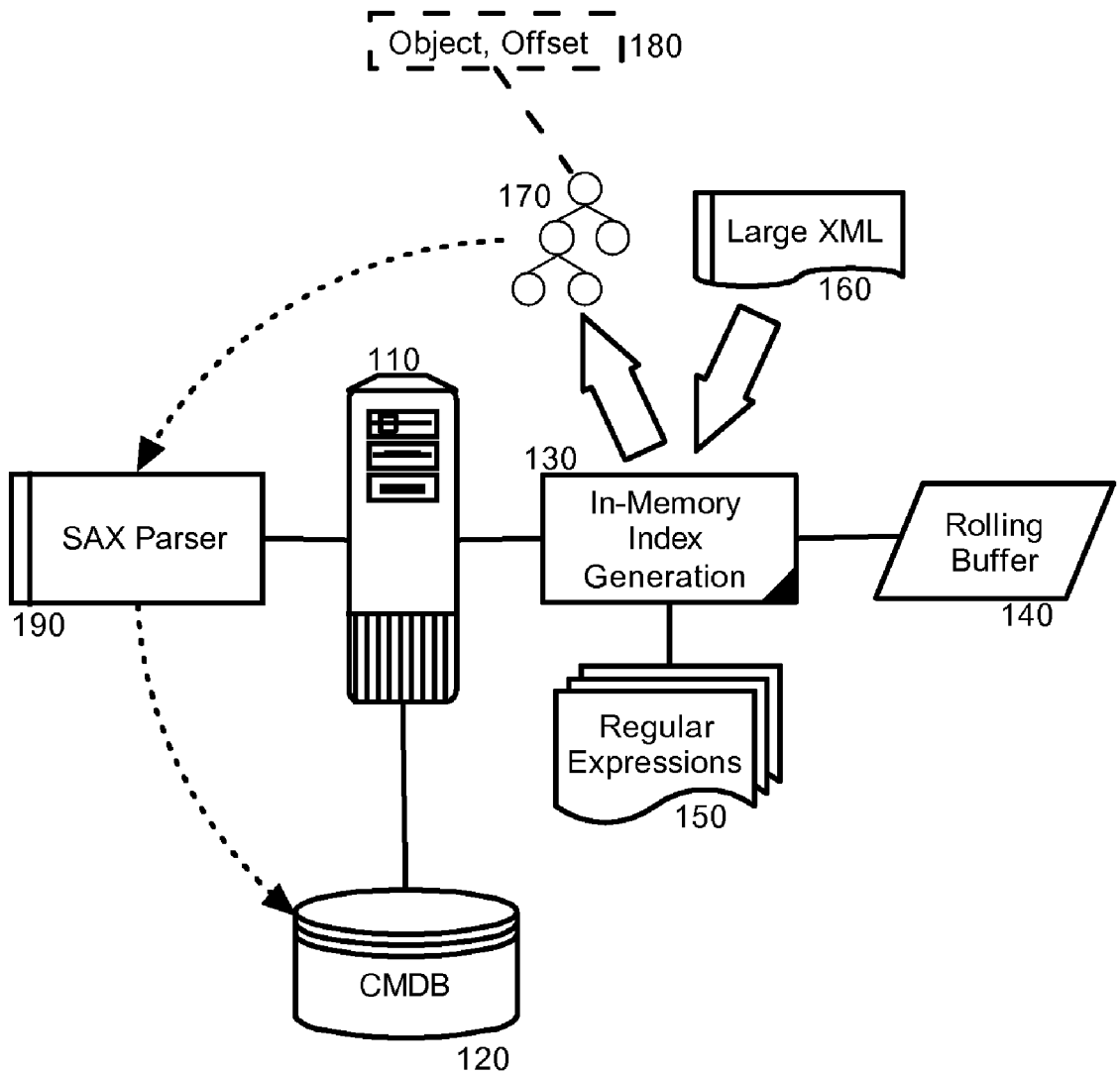
FIG. 1 is a schematic illustration of a markup language data processing system configured to efficiently process large relationship-specifying markup language documents.

In further illustration, FIG. 1 is a schematic illustration of a markup language data processing system configured to efficiently process large relationship-specifying markup language documents. The data processing system can include a host computing platform 110 coupled to a database such as a CMDB 120. In-memory index generation logic 130 can be coupled to the host computing platform 110 and can be operatively connected to a rolling buffer 140 and one or more regular expressions 150 for pattern matching content in the rolling buffer 140.

The in-memory index generation logic 130 can include program code enabled to process a large markup language document 160, such as an XML document, to produce an index 170. The index 170 in turn can include a plurality of nodes 180, each node 180 including an identifier for an object represented within the large markup language document 160, and an offset or position into the large markup language document 160. The index 170 can link different ones of the nodes 180 according to the relationships between the objects represented by the nodes.

Notably, the program code of the in-memory index generation logic 130 can be enabled to load only small chunks of the large markup language document 160 into the rolling buffer 140 and to apply the regular expressions 150 to the small chunks in the rolling buffer 140 in order to identify clauses within the large markup language document 160. Exemplary clauses can include component object clauses and relationship clauses such that component object clauses relate to component objects whereas relationship clauses define a relationship between component objects.

Whenever a clause can be identified through pattern matching by the regular expressions, the program code of the in-memory index generation logic 130 can yet be further enabled to add the position of the identified clause and an identifier or data relating to the identified clause into a node 180 in the index 170. In this way, a lightweight representation of the large markup language document 160 can be maintained without requiring the construction of a DOM tree for the large markup language document 160. Additionally, relationships between the clauses of the large markup language document 160 can be readily determined by reference to the index 170 without requiring the creation in memory of the DOM tree for the large markup language document 160.

Notably, a SAX parser can be coupled to the host computing platform 110. The SAX parser can be enabled to process the nodes 180 of the index 170 in order to determine when and how to write portions of the large markup language document 160 to the database 120. Whenever it is determined to write a clause to the database 120, the node 180 in the index 170 referring to the clause can be processed to determine a position within the large markup language document 160 of the clause. Subsequently, the actual clause can be retrieved from the large markup language document 160 and written to the database 120. Yet, the entirety of the markup language document 160 need not be loaded in memory in order to determine the clause to be added to the database 120. Rather, only the entirety of the index 170 need be loaded thereby consuming a substantially smaller memory footprint.

Figure 2:
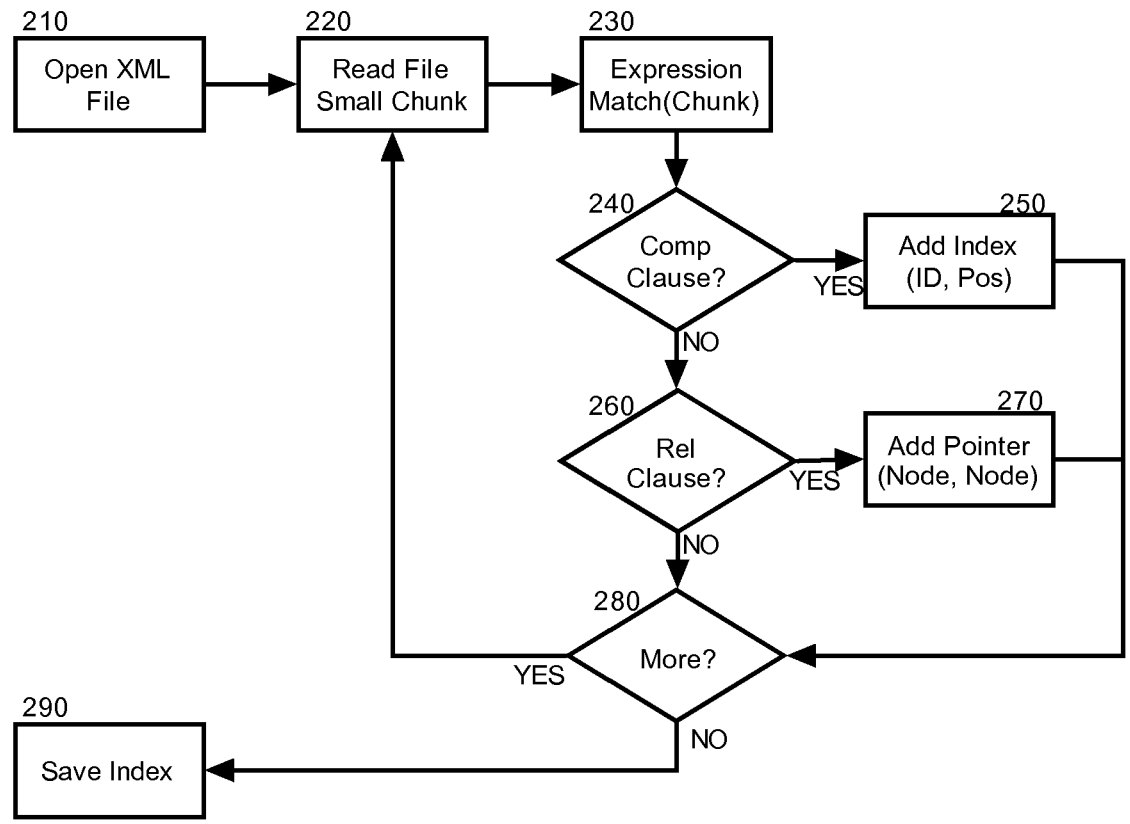
FIG. 2 is a flow chart illustrating a process for in-memory index generation; and, FIG. 3 is a flow chart illustrating a process for accessing an index in lieu of the markup language document.

Turning now to FIG. 2, a flow chart is shown that illustrates the operation of the in-memory index generation logic 130 of FIG. 1. Beginning in block 210, a relationship-specifying markup language document can be opened for reading and in block 220, a small chunk of the document can be read into a rolling buffer for analysis. In block 230, expression matching can be performed on the small chunk and in decision block 240, if a component clause is identified in consequence of the expression matching, in block 250, an identifier or other related data can be added to a node in the index, along with a position of the clause within the markup language document. Otherwise, in block 260, if a relationship clause is identified in consequence of expression matching, in block 270 a pointer can be established in the index between the nodes implicated by the relationship clause.

Figure 3:
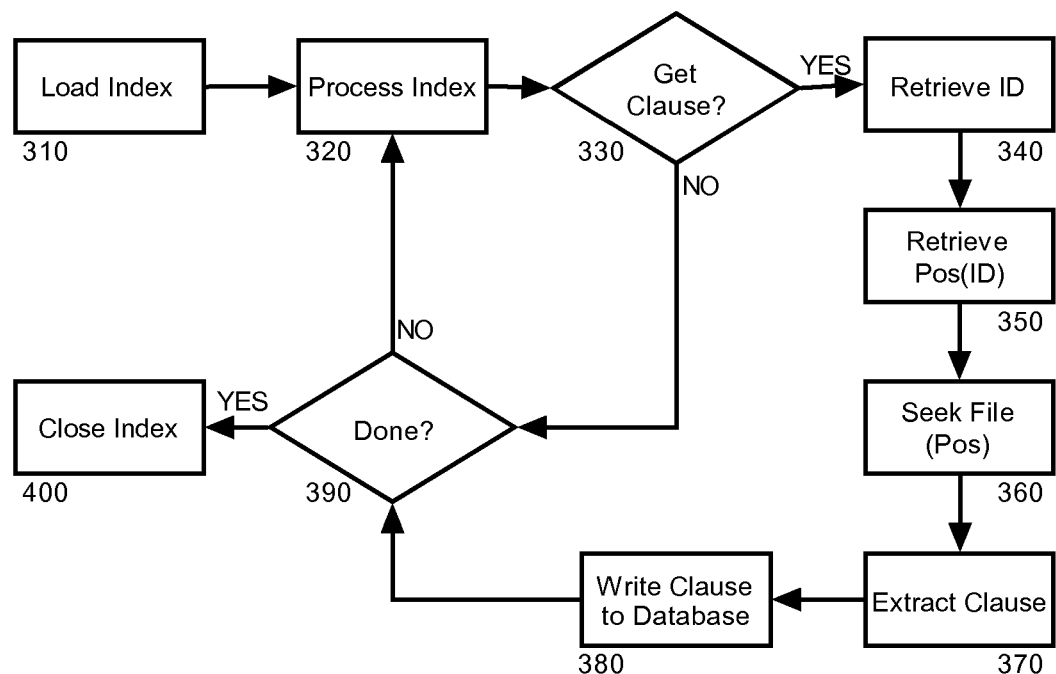

In either case, in decision block 280, if additional chunks can be read from the markup language document, the process can return through block 220. Otherwise, the process can end in block 290 where the index can be saved for later access. Finally referring to FIG. 3, a flow chart is shown illustrating a process for accessing the index in lieu of the markup language document in order to recognize relationships between clauses in the markup language document and to process the markup language document, for instance by bulk loading the markup language document into a database. Beginning in block 310, the index can be loaded into memory and in block 320, the index can be processed as a surrogate for the markup language document. In block 330, if it is determined that a clause is to be written from the markup language document to the database, in block 340 the identifier for the clause can be obtained from the index as can an associated file position in block 350.

In block 360, the obtained position can be used to seek to the file position in the markup language document. Thereafter, in block 370, the desired clause can be extracted from the markup language document in block 380, the clause can be written to the database along with the other nodes to which it is related. In decision block 390, if the index is not to be processed further, in block 400 the index can be closed. Otherwise, the process can repeat through block 320 until no further processing remains.

Notably, the processing that takes place using the in-memory index can construct objects in a data graph that must be written to the database at the same time. Consequently, the bare minimum of actual component objects are actually held in memory, and those component objects can be held only for a short time when preparing to write the data to the database. Additionally, by building the in-memory index and having the byte offset to every node in a particular data graph, the data graphs can be processed separately in parallel by different threads of execution.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for processing large relationship-specifying markup language documents, the method comprising:
    generating an index of nodes each node corresponding to a clause in the markup language document;
    processing the index in lieu of the markup language document;
    identifying clauses referenced within the index to be written to a database; and,
    extracting the identified clauses from the markup language document and writing the extracted clauses to the database.

2. The method of claim 1, wherein generating an index of nodes each node corresponding to a clause in the markup language document, comprises:
    reading small chunks of the markup language document into a rolling buffer;
    expression matching on the small chunks to identify individual clauses; and,
    responsive to identifying an individual clause in the rolling buffer, adding a node to the index with both an identifier for the individual clause and a position in the markup language document of the individual clause.

3. The method of claim 2, wherein extracting the identified clauses from the markup language document and writing the extracted clauses to the database, comprises:
    seeking to respective positions in the markup language document for different ones of the identified clauses;
    extracting the different ones of the identified clauses from the markup language document; and,
    writing the extracted different ones of the identified clauses to the database.

4. The method of claim 3, wherein seeking to respective positions in the markup language document for different ones of the identified clauses, comprises:
    identifying related clauses in the markup language document forming a data graph; and,
    seeking to respective positions in the markup language document for the identified related clauses.

5. The method of claim 2, further comprising performing the reading, expression matching and adding concurrently in separate threads of execution for different portions of the markup language document.

6. A computer program product comprising a tangible computer storage medium embodying computer usable program code for processing large relationship-specifying markup language documents, the computer program product comprising:

computer usable program code for generating an index of nodes each node corresponding to a clause in the markup language document;

computer usable program code for processing the index in lieu of the markup language document;

computer usable program code for identifying clauses referenced within the index to be written to a database; and, computer usable program code for extracting the identified clauses from the markup language document and writing the extracted clauses to the database.

7. The computer program product of claim 6, wherein generating an index of nodes each node corresponding to a clause in the markup language document, comprises:

computer usable program code for reading small chunks of the markup language document into a rolling buffer;

computer usable program code for expression matching on the small chunks to identify individual clauses; and, computer usable program code for adding a node to the index with both an identifier for the individual clause and a position in the markup language document of the individual clause responsive to identifying an individual clause in the rolling buffer.

8. The computer program product of claim 7, wherein extracting the identified clauses from the markup language document and writing the extracted clauses to the database, comprises:

seeking to respective positions in the markup language document for different ones of the identified clauses;

extracting the different ones of the identified clauses from the markup language document; and, writing the extracted different ones of the identified clauses to the database.

9. The computer program product of claim 8, wherein the computer usable program code for seeking to respective positions in the markup language document for different ones of the identified clauses, comprises:

computer usable program code for identifying related clauses in the markup language document forming a data graph; and, computer usable program code for seeking to respective positions in the markup language document for the identified related clauses.

10. The computer program product of claim 7, further comprising computer usable program code for performing the reading, expression matching and adding concurrently in separate threads of execution for different portions of the markup language document.

* * * * *